March 20, 1956  M. KRAMCSAK, JR  2,738,540
CORNER BRACKET ASSEMBLY FOR CASTERS
Filed July 27, 1953  2 Sheets-Sheet 1
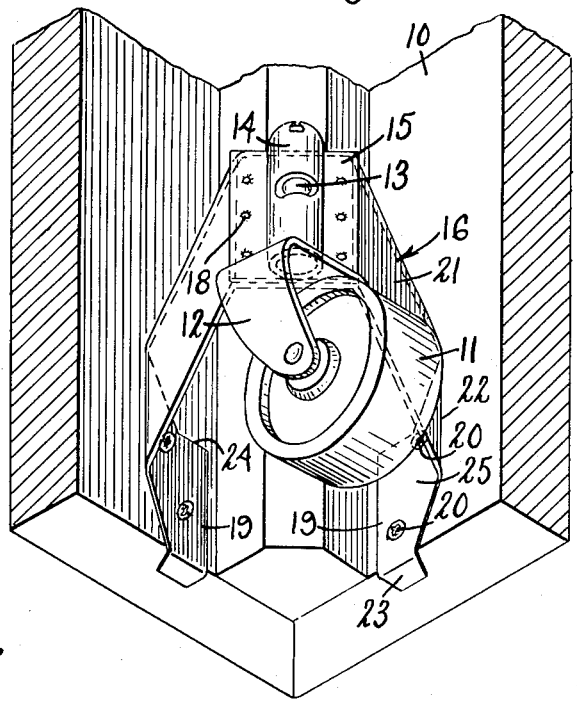
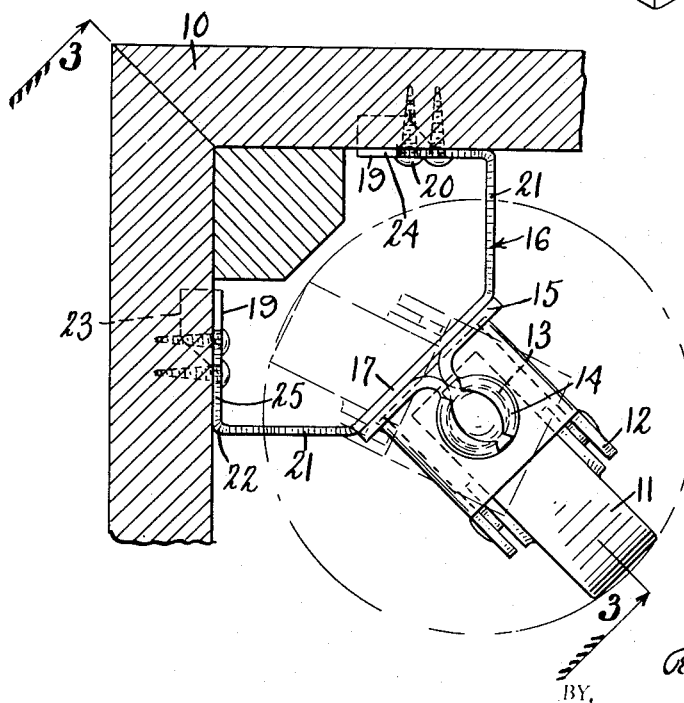
INVENTOR
M. Kramcsak, Jr.
Rockwell & Bartholow
BY.
ATTORNEYS

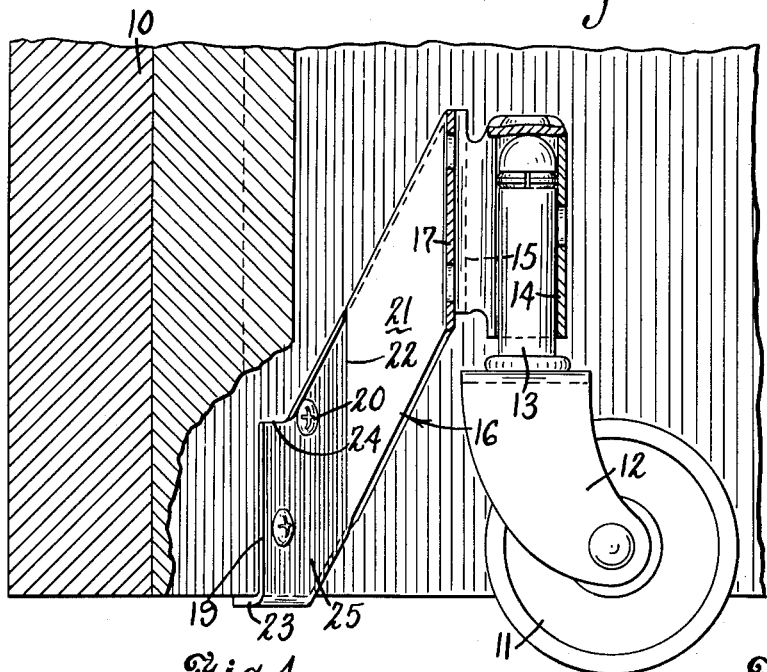
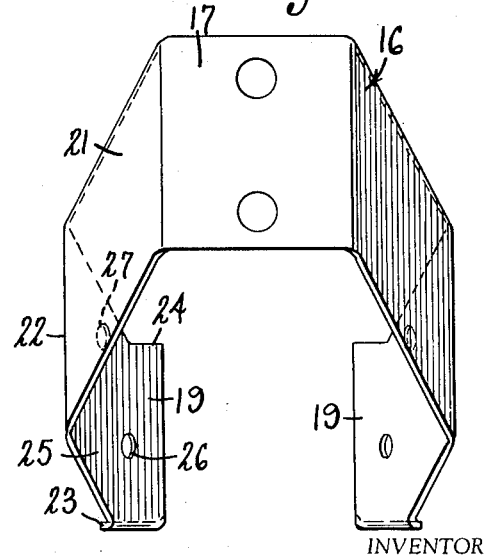
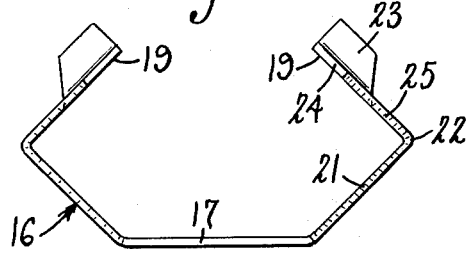
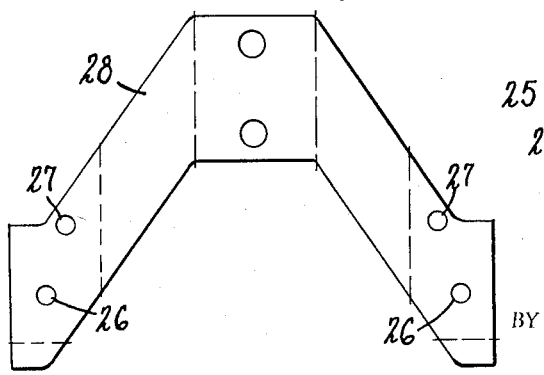

United States Patent Office 2,738,540
Patented Mar. 20, 1956

2,738,540

CORNER BRACKET ASSEMBLY FOR CASTERS

Michael Kramcsak, Jr., Bridgeport, Conn., assignor to The Bassick Company, Bridgeport, Conn., a corporation of Connecticut Application July 27, 1953, Serial No. 370,265

4 Claims. (Cl. 16—29)

This invention relates to corner bracket assemblies for casters and has reference particularly to assemblies suitable for TV (television) floor model wood cabinets and similar relatively light equipment.

In the cabinets of such floor models, it is desirable to have the casters concealed, for the most part, behind the woodwork of the cabinet with the lower boundary of the cabinet quite close to the floor. In the past, this requirement has given rise to some difficulty in providing a satisfactory caster mounting and there has been difficulty also in providing a sufficiently strong structure of low cost involving a minimum use of wood parts.

An object of the present invention is to provide an improved caster bracket assembly for uses such as indicated above which provides strong support for the caster and is relatively inexpensive.

Another object is to provide a very strong bracket member useable in the relationship above mentioned which can be employed for mounting in a concealed location a caster of the stem and socket type, in other words, one which has an upstanding stem adapted to be introduced into the lower end of an elongated socket.

A further purpose is to provide an assembly in which the member presenting the caster socket, and the carrying bracket attached to the cabinet, have an improved relationship to each other and the corner portion of the cabinet.

In the accompanying drawings:

Fig. 1 is a fragmentary perspective view from below of a corner portion of a cabinet provided with a caster assembly embodying the invention;

Fig. 2 is a top plan view partially in horizontal section of the assembly shown in Fig. 1;

Fig. 3 is a section on line 3—3 of Fig. 2;

Fig. 4 is a detail top plan view of the bracket member;

Fig. 5 is a face view of the bracket member; and

Fig. 6 is a detail of the blank used in making a bracket member.

In the drawings, there is shown the lower corner portion of a wooden cabinet such as used in TV floor models, this corner portion being equipped within the corner or angle with an assembly which includes a caster of the stem and socket type. The socket portion of the caster is secured as by welding to a supporting bracket of sheet metal attached to the woodwork and extending across the corner portion of the cabinet. The arrangement is such that only a relatively small portion of the caster wheel projects below the lower boundary of the cabinet and, moreover, the arrangement is such that the caster wheel is mounted for full swiveling in the corner portion of the cabinet without interference. The caster has a horn or yoke provided with an upstanding stem and this stem is inserted from below into an elongated socket provided with attaching flanges and these flanges are preferably welded to the upper middle portion of the mounting bracket. The mounting bracket is of sheet metal and is provided at the upper central part with a flat portion to which the flanges of the caster socket are spot welded.

From this upper central part of the bracket, portions of the bracket extend downwardly and rearwardly toward the wooden walls to which they are attached, as hereinafter described.

In the drawings, the corner portion of the cabinet is indicated at 10, the caster wheel at 11, the horn at 12, the stem at 13, the stem socket at 14, the attaching flange portion of the stem socket at 15, and the sheet metal mounting bracket at 16. The upper central flat part of the bracket to which the flange portion 15 is applied is indicated at 17. The parts 15 and 17 may be strongly secured together in a suitable manner as by means of spot welds 18.

The caster illustrated in the drawings is of a well known type and the socket portion 14 is also of a well known kind.

As will be observed from the drawings, the sheet metal bracket 16 extends across the corner portion of the cabinet, its upper central part 17 being at the highest location and its extremities 19 being lowermost, and said extremities 19 being secured to the respective wooden walls by means such as wood screws 20. From the upper central part 17 of the bracket, side portions or wings (of which the extremities 19 are parts) are extended downwardly and inwardly with respect to the corner portion of the cabinet.

In the drawings, there is shown a bracket in which, at each side of the upper central part 17, there extends a wing portion 21 directed downwardly and inwardly toward the corner portion of the cabinet, this wing portion being bent intermediate of its ends to form an angle or a corner 22 which, in plan, presents an angle of substantially 90° in the wing portion, as shown in Fig. 4. This part of the wing portion merges into the extremity 19 previously mentioned and at the lower end of the extremity 19 there is bent up a positioning lug 23 adapted to lie horizontally against the lower edge of the cabinet, as shown in Figs. 1 and 3, in the assembled position of the parts. Each wing portion 21 extends downwardly from the upper central part 17 at an angle of approximately 35° to the vertical, as shown in Fig. 5, the upper and lower edges of the wing portion being substantially parallel to each other and the wing extremity 19 having a side edge which is substantially vertical and a short upper edge 24 which is horizontal and parallel to the horizontal lug 23. As shown in Fig. 4, that part of the wing portion which is joined to the upper central part 17 has an angle of about 45° (horizontally) to the upper central part. The wing portion is reversely bent to provide the 90° angle previously mentioned and the reversely bent part, as shown in Fig. 4, terminates at the vertical edge of the extremity 19, the location of which vertical edge is about opposite the corresponding side margin of the upper central part 17. In other words, the space between the vertical edges of the extremities 19 is approximately the same as the width of the part 17. It is understood that the extremities 19 lie in the same planes as the reversely bent portions of the wings, these reversely bent portions being indicated at 25, the only parts which are bent up from the planes of the parts 25 being the lower positioning lugs 23.

The angle formation of the bracket 16 provided by the bending of the integral wing portions, as above described, provides a very strong support for the caster socket. The attaching flange portion 15 of the caster socket comprises parts integral with the socket and these parts or flanges lie in a common plane as best shown in Fig. 2, and by welding these flanges to the part 17, a strong support is provided for the caster at the middle part of the sheet metal bracket (Fig. 2).

The wood screws 20 pass through perforation in the parts 25, each of said parts having a lower hole 26 for one screw and an upper hole 27 for the upper screw. The lower hole 26 is located about midway of the height of the shouldered extremity 19. The hole 27 for the other screw is offset laterally from the hole 26 and located near the edge portion 24 and slightly inwardly from the upper edge of the part 25.

In fabricating the bracket member, it is advantageous to stamp out a flat blank of sheet metal such as shown at 28 in Fig. 6. This blank is provided with the holes 26 and 27 described above and is usually provided with a pair of pilot holes in the upper intermediate portion. After this blank has been stamped out in the shape shown in Fig. 6 it is bent in the manner previously described to create the finished bracket. In Fig. 6, the locations where the blank is bent are indicated by broken lines.

In the form shown, only two screws are necessary for attaching each bracket wing portion to its supporting wall. For providing a strong construction with a minimum number of screws and for inhibiting splitting of the wood, the screw holes 26 and 27 are placed in different vertical planes and in different horizontal planes.

By the employment of a metallic supporting structure for the caster, such as herein described, it is made possible to eliminate the more expensive wooden rails and corner pieces that have commonly been required heretofore to support casters of the stem and socket type in a hidden location in a wooden cabinet.

The strength of the supporting bracket for the caster is substantially increased by the operation of bending it from the planar shape of Fig. 6 to the box-like or channeled shape in plan shown in Fig. 4. The wings are bent up from the flat central part at acute angles (horizontally) and the wings are bent intermediate of their ends to create the reverse bends, whereby the extremities of the wings are turned toward each other to provide converging extremities in a shape which is essentially channeled in plan (Fig. 4). Parts of the side walls of this channeled shape diverge from the central or middle portion 17 and other portions converge to provide the mouth of the channel shape. The converging parts of the bracket sides are the parts which are attached to the wooden walls and this provides a strong support for the caster, while, at the same time, the caster stem is placed in a position where it can swivel in all directions. As will be apparent from Fig. 6, the extremities of the wing portions are created by vertical cuts that are biased with respect to the angularly disposed wing portions.

In the form shown, the upper flat central part of the bracket extends at an angle of substantially 45° to the walls forming the corner, the parts of the wing portions immediately joined to this flat central part are substantially normal to the walls (Fig. 2), and the reversely bent parts 25 of the wing portions are parallel to the respective walls to which they are attached.

The present structure provides a very satisfactory caster mounting for TV floor model wood cabinets, but the improved caster mounting can also be used in other applications.

What I claim is:

1. In a corner bracket and caster assembly for a television cabinet or like structure in which two upright walls meeting at right angles to each other form an internal corner space within which is mounted a caster having a wheel substantially masked by the lower parts of said walls and having an upstanding swiveling stem for said wheel, a sheet metal wall bracket having an upper central planar or web portion for vertical disposition crosswise of the corner space at an angle of substantially 45° to said walls and having applied to the face remote from the meeting parts of said walls a supporting socket part for the wheel stem, said bracket having integral with said planar portion wings at the sides thereof diverging downwardly and in plan being at obtuse angles to said planar portion and directed toward said walls substantially at right angles thereto, said wings having integral therewith at their lower parts downwardly converging extremities for attachment to said walls which in plan are at substantially 90° to the upper parts of said wings and said wings with said extremities being directed continuously downwardly from said planar portion at an acute angle to the vertical and of a length such that in the assembly said planar portion is at a considerable distance above the lower edges of the walls.

2. In a corner bracket assembly such as described, a corner bracket for attachment to a cabinet in an interior corner thereof and for support of a swiveling caster in said corner, said bracket having an upper middle portion crosswise of the corner for supporting a swiveling caster stem in a socket at a substantial distance above the lower edges of the cabinet in said corner and having wings integral with said middle portion extending downwardly at an acute angle to the vertical and whose lower extremities are attachable to the corner walls closely adjacent the lower edges of the corner and at a substantial distance below said middle portion, said wings having in plan straight portions joined to said middle portion at obtuse angles and directed toward the corner walls at right angles thereto and also having lower extremities integrally joined to said straight portions and in plan extending substantially at right angles to said straight portions and attachable to the corner walls as aforesaid, said extremities in plan being of a dimension substantially equal to that of said straight portions.

3. A brackeit as defined in claim 2, in which the bracket is of sheet metal presenting bends along vertical lines at the junctions of the middle portions with said straight portions and at the junctions of said straight portions with said lower extremities and in which said extremities have vertical free lateral edges and at the lower ends integral positioning lugs joined to said extremities along horizontal lines.

4. A corner bracket as defined in claim 2, in which the extension of the wings downwardly from said middle portion is at least as great as the vertical dimension of said middle portion.

References Cited in the file of this patent

UNITED STATES PATENTS

| | | |
|---|---|---|
| 331,211 | Osborn et al. | Nov. 24, 1885 |
| 742,770 | Wheeler | Oct. 27, 1903 |
| 790,733 | Linn et al. | May 23, 1905 |
| 1,442,097 | Rowntree | Jan. 16, 1923 |
| 2,458,595 | Herts | Jan. 11, 1949 |
| 2,529,390 | Hauer | Nov. 7, 1950 |
| 2,597,147 | Haseltine | May 20, 1952 |